(12) United States Patent
Yoshida (10) Patent No.: US 11,312,420 B2
(45) Date of Patent: Apr. 26, 2022

(54) VEHICLE FRONT STRUCTURE

(71) Applicant: Toyota Jidosha Kabushiki Kaisha, Toyota (JP)

(72) Inventor: Eiji Yoshida, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/830,967

(22) Filed: Mar. 26, 2020

(65) Prior Publication Data

US 2020/0353993 A1 Nov. 12, 2020

(30) Foreign Application Priority Data

May 8, 2019 (JP) .............................. JP2019-088599

(51) Int. Cl.
*B62D 25/08* (2006.01)
*B60R 19/02* (2006.01)

(52) U.S. Cl.
CPC .............. *B62D 25/08* (2013.01); *B60R 19/02* (2013.01)

(58) Field of Classification Search
CPC ...... B62D 25/08; B62D 21/152; B60R 19/02; B60R 19/023; B60R 19/34

USPC .......................... 293/134; 296/187.09, 187.1
See application file for complete search history.

(56) References Cited

U.S. PATENT DOCUMENTS

| 2015/0298634 A1 | 10/2015 | Hara et al. |
| 2016/0023685 A1 | 1/2016 | Fujii et al. |
| 2019/0161037 A1 | 5/2019 | Yoshida et al. |

FOREIGN PATENT DOCUMENTS

| CN | 105270478 A | 1/2016 |
| JP | 2014-113894 A | 6/2014 |
| JP | 2019-093942 A | 6/2019 |

*Primary Examiner* — Dennis H Pedder
(74) *Attorney, Agent, or Firm* — Dinsmore & Shohl LLP (57) ABSTRACT

A vehicle front structure includes: side frames of a vehicle front part; a bumper reinforcement attached to front ends of the side frames; a load transmission member attached to a side end portion of the bumper reinforcement; and a cover member attached to a rear end of the load transmission member. The cover member is an L-shaped section member in which an outer surface of a corner part of the cover member has a curved surface, the cover member extending in the vehicle up-down direction. The cover member is attached such that an upper end of the cover member projects upward from an upper face of the load transmission member, and the cover member covers an inner portion, in the vehicle width direction, of the rear end of the load transmission member.

5 Claims, 6 Drawing Sheets

VEHICLE FRONT STRUCTURE

CROSS-REFERENCE TO RELATED APPLICATIONS

This application claims priority to Japanese Patent Application No. 2019-088599 filed on May 8, 2019, which is incorporated herein by reference in its entirety including the specification, drawings and abstract.

BACKGROUND

1. Technical Field

The present disclosure relates to a vehicle front structure and more particularly relates to a structure for collision load absorption.

2. Description of Related Art

A front body structure of a vehicle includes a pair of right and left side frames as side frame members, and a bumper reinforcement extending in the vehicle width direction and connected to front ends of the right and left side frames. The right and left side frames are provided in a vehicle front part and extend in the vehicle front-rear direction. The bumper reinforcement includes side end portions projecting outward in the vehicle width direction from the side frames, respectively. There has been proposed a structure provided with a load transmission member extending rearward and inward in the vehicle width direction from a side end portion (e.g., see Japanese Unexamined Patent Application Publication No. 2014-113894 (JP 2014-113894 A)). The load transmission member is configured to transmit a collision load to a side frame when a small overlap collision occurs, that is, when a collision object collides with the side end portion.

SUMMARY

In the meantime, it is considered to absorb impact energy by bending and deforming the side frame member by a collision load transmitted from the load transmission member. The side frame member has a closed sectional shape. However, there is such a case where a rear end of the load transmission member cuts into a side face of the side frame member and causes stress concentration on the side face, so that the whole side frame member does not bend and deform, but only the side face of the side frame member breaks. In this case, desired collision energy cannot be absorbed.

In view of this, an object of the present disclosure is to absorb desired impact energy by bending and deforming a whole side frame member by a collision load transmitted from a load transmission member at the time of a collision.

A vehicle front structure of the present disclosure is a vehicle front structure including a pair of right and left side frame members, a bumper reinforcement, a load transmission member, and a cover member. The right and left side frame members are provided in a vehicle front part and extend in the vehicle front-rear direction. The bumper reinforcement is attached to front ends of the right and left side frame members. The bumper reinforcement extends in the vehicle width direction. The bumper reinforcement has right and left side end portions projecting outward in the vehicle width direction from the side frame members, respectively. The load transmission member is attached to each of the side end portions of the bumper reinforcement. The load transmission member extends rearward in the vehicle front-rear direction and inward in the vehicle width direction. The load transmission member is configured to transmit a collision load to each of the side frame members at the time of a collision. The cover member is attached to a rear end of the load transmission member. The cover member is an L-shaped section member in which an outer surface of a corner part of the cover member has a curved surface, and the cover member extends in the vehicle up-down direction. The cover member is attached to an inner portion, in the vehicle width direction, of the rear end of the load transmission member such that an upper end of the cover member projects upward from an upper face of the load transmission member. The cover member is configured to cover the inner portion, in the vehicle width direction, of the rear end of the load transmission member.

Hereby, at the time of a collision, the corner part of the cover member makes a surface contact or a line contact with a side face of the side frame member. The outer surface of the corner part of the cover member has a curved surface. This accordingly makes it possible to relax stress concentration on the side face of the side frame member and absorb desired impact energy by bending and deforming the whole side frame member by a collision load transmitted from the load transmission member.

In the vehicle front structure of the present disclosure, the side frame members may be longitudinal members having a square closed sectional shape. The cover member may be placed to overlap, in the up-down direction, an upper edge line on an outer side of a corresponding one of the side frame members in the vehicle width direction, when the cover member is viewed from a vehicle side face. At the time of the collision, the collision load may be transmitted to the corresponding one of the side frame members such that the outer surface of the corner part abuts with the edge line of the corresponding one of the side frame members.

This allows the collision load to be transmitted to the edge line of the side frame member having a square closed sectional shape, thereby making it possible to more surely bend the side frame member, so that impact energy can be absorbed more effectively.

The present disclosure can absorb desired impact energy by bending and deforming a whole side frame member by a collision load transmitted from a load transmission member at the time of a collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, the following describes a vehicle front structure 100 of an embodiment. The following description deals with the vehicle front structure 100 for a vehicle using a ladder frame 12. In the drawings, the orientation of an arrow FR indicates the front side in the vehicle front-rear direction, the orientation of an arrow LH indicates the left side in the vehicle right-left direction (the vehicle width direction), and the orientation of an arrow UP indicates the upper side in the vehicle up-down direction. In the following description, terms indicative of directions and orientations such as front, rear, right, left, up, and down indicate directions and orientations with respect to the vehicle unless otherwise specified. Further, in terms of the right-left direction, a side close to the center line of the vehicle is referred to as inward in the vehicle width direction, and a side farther from the center line of the vehicle is referred to as outward in the vehicle width direction.

Figure 1:
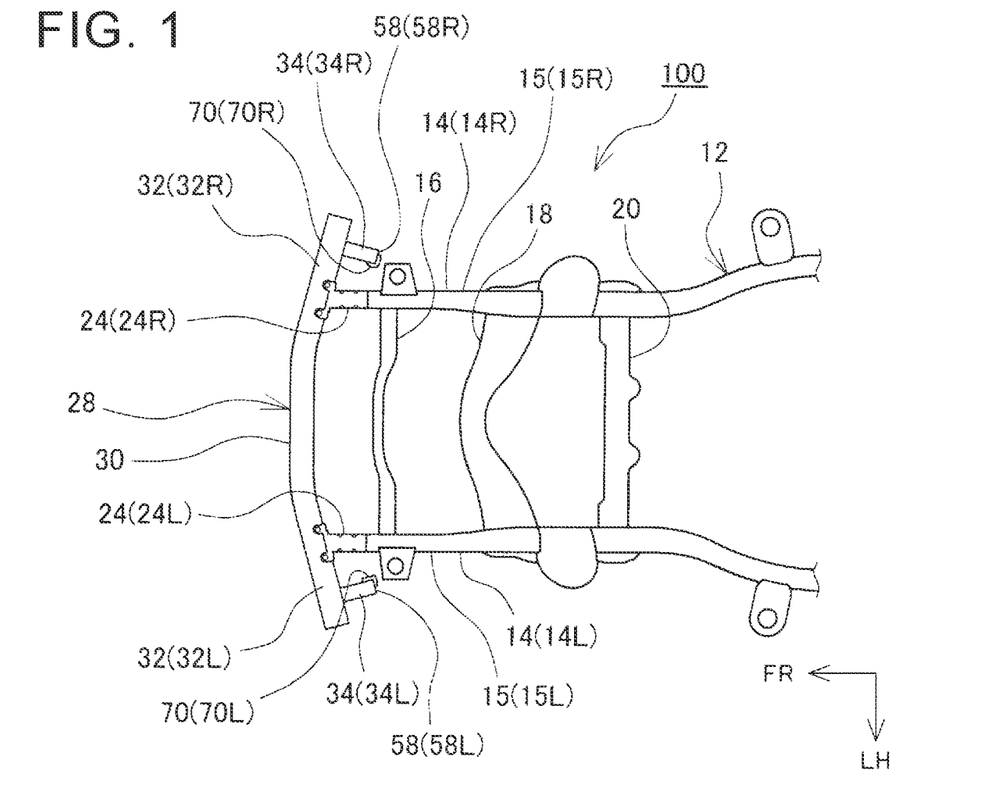
FIG. 1 is a plan view illustrating a vehicle front structure according to an embodiment.
Figure 2:
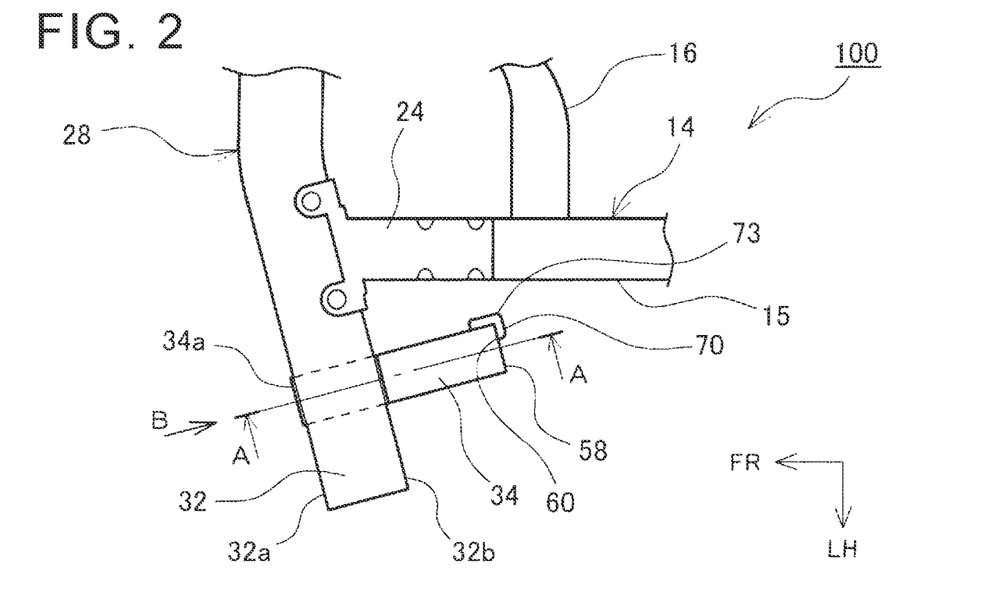
FIG. 2 is an enlarged plan view illustrating a left front part of the vehicle front structure illustrated in FIG. 1.

As illustrated in FIGS. 1, 2, the vehicle front structure 100 is a front structure for the vehicle including the ladder frame 12. The vehicle front structure 100 includes: a pair of right and left side frames 14R, 14L as side frame members provided in a vehicle front part and extending in the vehicle front-rear direction; a bumper reinforcement 28 attached to front ends of the right and left side frames 14R, 14L and extending in the vehicle width direction; load transmission members 34R, 34L attached to right and left side end portions 32R, 32L of the bumper reinforcement 28; and cover members 70R, 70L attached to rear ends 58R, 58L of the load transmission members 34R, 34L.

The side frames 14R, 14L are made of steel. The side frames 14R, 14L are longitudinal members having a square closed sectional shape and include edge lines 15R, 15L formed in respective corner parts. Front end portions of the side frames 14R, 14L are formed as crash boxes 24R, 24L having strength lower than that of parts behind the front end portions. At the time of a front collision, the crash boxes 24R, 24L are crushed to relax impact. Further, the side frames 14R, 14L are connected to each other in the vehicle width direction via a plurality of cross-members 16, 18, 20 extending in the vehicle width direction.

The bumper reinforcement 28 includes: a central portion 30 positioned between the right and left side frames 14R, 14L; and the side end portions 32R, 32L projecting outward in the vehicle width direction respectively from right and left end portions of the central portion 30 such that the side end portions 32R, 32L are disposed outside the side frames 14R, 14L in the vehicle width direction, respectively. The bumper reinforcement 28 has a bending or curved shape projecting forward as illustrated herein. As a result, outer ends of the side end portions 32R, 32L are inclined to be placed rearward from inner ends of the side end portions 32R, 32L, the inner ends being connected to the central portion 30.

The load transmission members 34R, 34L attached to the side end portions 32R, 32L of the bumper reinforcement 28 are attached to the side end portions 32R, 32L such that the load transmission members 34R, 34L extend rearward in the vehicle front-rear direction and inward in the vehicle width direction from the side end portions 32R, 32L. At the time of a so-called small overlap collision, a corresponding one of the load transmission members 34R, 34L transmits a collision load caused by the collision to a corresponding one of the side frames 14R, 14L. The small overlap collision is a collision in which an object collides with an outer part of the vehicle front part in the vehicle width direction, the outer part corresponding to one fourth of the vehicle front part. Details of the load transmission members 34R, 34L will be described later.

The side frames 14R, 14L, the crash boxes 24R, 24L, the side end portions 32R, 32L, the load transmission members 34R, 34L, and the cover members 70R, 70L make respective pairs on the right and left sides such that each of the pairs is provided symmetrically in the right-left direction. In the following description, when it is not necessary to distinguish them from each other in terms of right and left, the side frames 14R, 14L are just referred to as the side frame 14, the edge lines 15R, 15L are just referred to as the edge lines 15, the crash boxes 24R, 24L are just referred to as the crash box 24, the side end portions 32R, 32L are just referred to as the side end portion 32, the load transmission members 34R, 34L are just referred to as the load transmission member 34, the rear ends 58R, 58L are just referred to as the rear end 58, and the cover members 70R, 70L are just referred to as the cover member 70.

Figure 3:
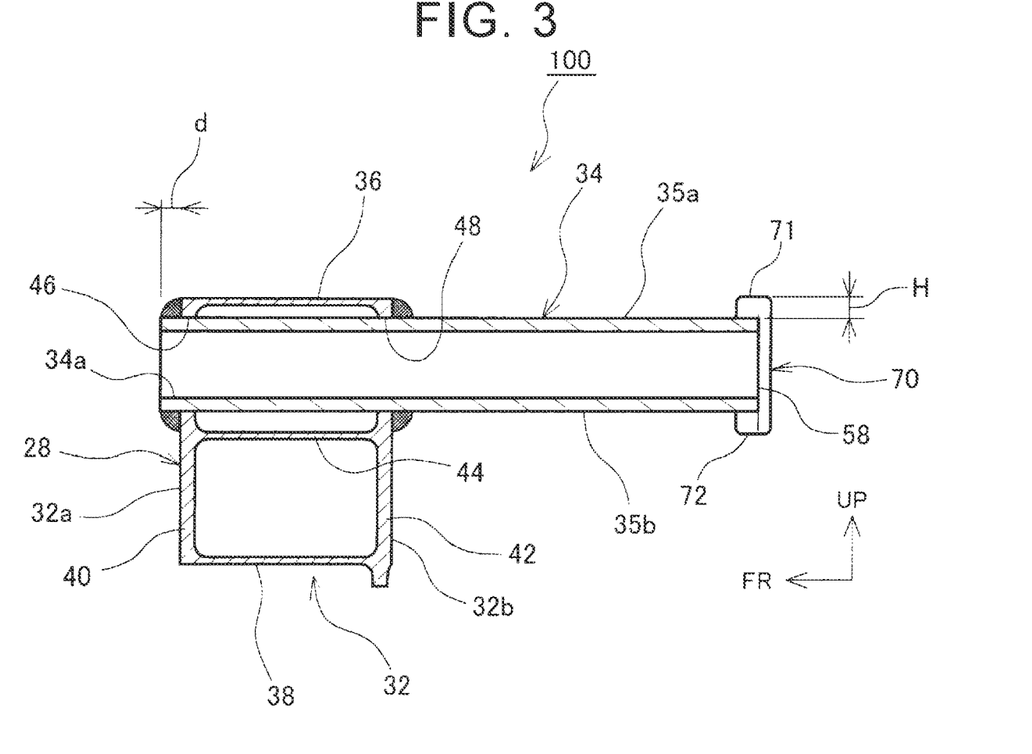
FIG. 3 is a sectional view of a bumper reinforcement and a load transmission member taken along a line A-A in FIG. 2.
Figure 4:
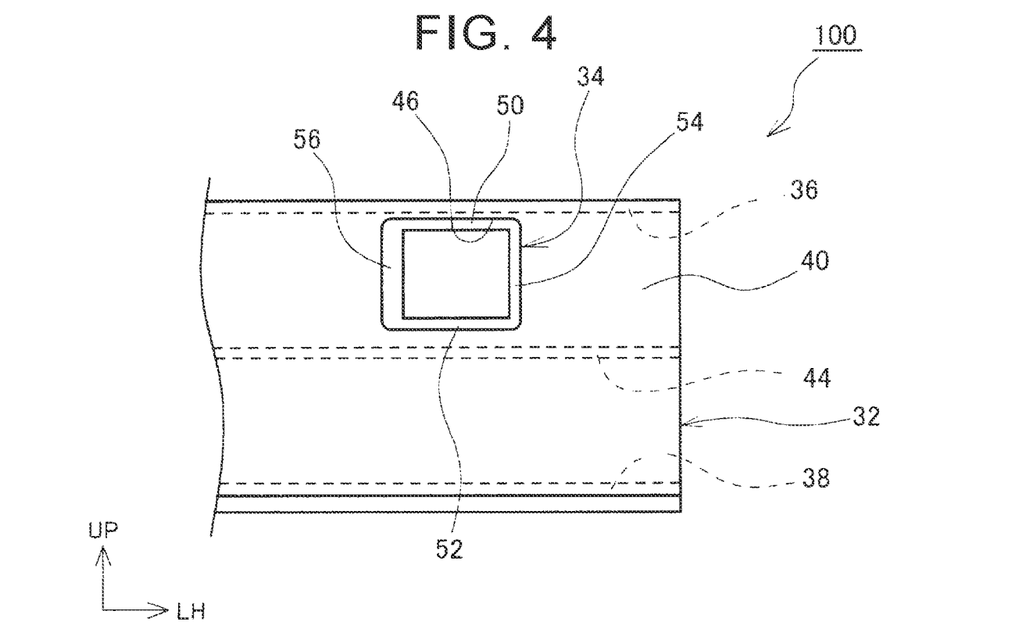
FIG. 4 is an arrow view of the bumper reinforcement and the load transmission member along an arrow B in FIG. 2.

As illustrated in FIGS. 3, 4, the side end portion 32 of the bumper reinforcement 28 has a hollow square sectional shape and includes an upper wall 36 corresponding to an upper side of the square of the section, a lower wall 38 corresponding to a lower side of the square, a front wall 40 corresponding to a front side of the square in the vehicle front-rear direction, and a rear wall 42 corresponding to a rear side of the square in the vehicle front-rear direction. The square as the sectional shape of the side end portion 32 can be a rectangular shape, for example. In this case, the upper wall 36 and the lower wall 38 may be placed horizontally, and the front wall 40 and the rear wall 42 may be placed vertically. Further, the side end portion 32 includes a reinforcing wall 44 between the upper wall 36 and the lower wall 38. The reinforcing wall 44 is placed so as to connect the front wall 40 to the rear wall 42. The reinforcing wall 44 can be provided over the overall length of the side end portion 32 and also can be placed horizontally. The reinforcing wall 44 is provided so as to achieve necessary strength and rigidity of the side end portion 32. The number of reinforcing walls 44 is not limited to one, and a plurality of reinforcing walls 44 may be provided as necessary. When the side end portion 32 has sufficient strength, the reinforcing wall 44 may not be provided. The front wall 40 and the rear wall 42 have openings 46, 48 configured to receive the load transmission member 34, and the openings 46, 48 are provided at positions between the upper wall 36 and the reinforcing wall 44. The side end portion 32 is made of metal, e.g., aluminum. The central portion 30 of the bumper reinforcement 28 also has the same configuration as the side end portion 32. By use of a material such as aluminum that is suitable for extrusion, the bumper reinforcement 28 can be manufactured by forming the central portion 30 and the side end portion 32 by extrusion.

Figure 5:
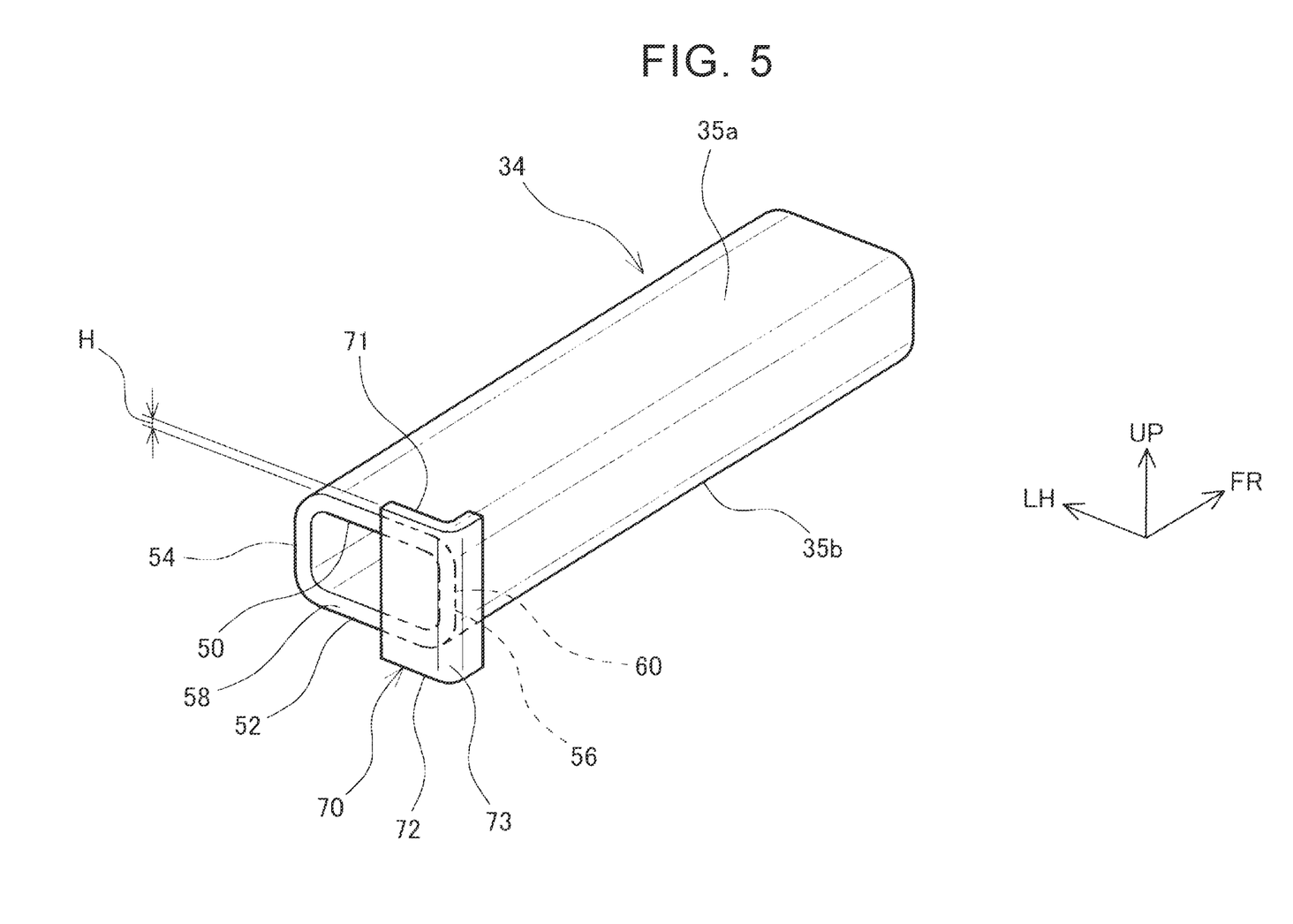
FIG. 5 is a perspective view illustrating the load transmission member of the vehicle front structure according to the embodiment.

As illustrated in FIG. 5, the load transmission member 34 has an angular tubular shape having a hollow square section. The load transmission member 34 includes an upper wall 50 corresponding to an upper side of the square of the section, a lower wall 52 corresponding to a lower side of the square, an outer wall 54 corresponding to an outer side of the square in the vehicle width direction, and an inner wall 56 corresponding to an inner side of the square in the vehicle width direction. The square as the sectional shape of the load transmission member 34 can be a rectangular shape, for example. In this case, the upper wall 50 and the lower wall 52 may be placed horizontally, and the outer wall 54 and the inner wall 56 may be placed vertically. The walls 50, 52, 54, 56 have the same thickness or may have different thicknesses. For example, by use of a material such as aluminum that is suitable for extrusion, the load transmission member 34 can be manufactured by extrusion.

Referring back to FIGS. 3, 4, the load transmission member 34 penetrates through the side end portion 32 of the bumper reinforcement 28 such that the load transmission member 34 crosses the side end portion 32 between the upper wall 36 and the reinforcing wall 44 of the side end portion 32. The load transmission member 34 is connected to the front wall 40 and the rear wall 42. The load transmission member 34 penetrates through the side end portion 32 from a front face 32a of the side end portion 32 and further extends rearward in the vehicle front-rear direction and inward in the vehicle width direction such that the load transmission member 34 extends diagonally to the center line of the vehicle.

The load transmission member 34 is joined to the front wall 40 and the rear wall 42 of the side end portion 32 by arc-welding performed along peripheries of the openings 46, 48 formed in the front wall 40 and the rear wall 42. In order to join the load transmission member 34 by arc-welding, a front end portion 34a of the load transmission member 34 projects forward in the vehicle front-rear direction from the front face 32a of the side end portion 32 only by a length d. Fillet welding is performed between an outer periphery of the front end portion 34a thus projecting and the periphery of the opening 46 of the front face 32a of the side end portion 32. In terms of a rear-side part of the load transmission member 34, fillet welding is performed between a part projecting from a rear face 32b of the side end portion 32 and the periphery of the opening 48. Fillet welding may be performed on the whole peripheries of the openings 46, 48 or may be performed on only parts of the peripheries, e.g., only along the upper sides and the lower sides of the openings 46, 48.

The upper wall 50 of the load transmission member 34 and the upper wall 36 of the side end portion 32 of the bumper reinforcement 28 are placed in parallel to each other and adjacent to each other. Instead of this or in addition to this, the lower wall 52 of the load transmission member 34 and the reinforcing wall 44 of the bumper reinforcement 28 are placed in parallel to each other and adjacent to each other.

As illustrated in FIG. 5, the cover member 70 is attached to an inner portion 60, in the vehicle width direction, of the rear end 58 of the load transmission member 34. The cover member 70 is an L-shaped section member in which an outer surface 73 of a corner part has a curved surface. The cover member 70 extends in the vehicle up-down direction. The cover member 70 is attached to the inner portion 60, in the vehicle width direction, of the rear end 58 of the load transmission member 34 such that an upper end 71 of the cover member 70 projects upward from an upper face 35a of the load transmission member 34 only by a length H. The cover member 70 covers the inner portion 60, in the vehicle width direction, of the rear end 58 of the load transmission member 34. Further, a bottom end 72 of the cover member 70 projects downward from a bottom face 35b of the load transmission member 34. In the vehicle front structure 100 of the embodiment, the outer surface 73 of the corner part of the cover member 70 is a cylindrical surface, but the outer surface 73 is not limited to the cylindrical surface, provided that the outer surface 73 is a smooth curved surface. For example, the outer surface 73 may be an elliptical tubular surface.

In a case where the outer surface 73 of the corner part is formed as the cylindrical surface, it is desirable that the radius of the cylindrical surface be a few millimeters or less, e.g., about 3 millimeters. The reason is as follows. That is, when the radius of the cylindrical surface is large, the outer surface 73 may slip rearward in the vehicle front-rear direction on a surface of the side frame 14 at the time when the outer surface 73 abuts with a side face of the side frame 14. This may reduce a bending amount of the side frame 14.

The outer surface 73 of the cover member 70 is separated from the side frame 14. Further, the cover member 70 is placed to overlap, in the up-down direction, the upper edge line 15 on the outer side of the side frame 14 in the vehicle width direction, when the cover member 70 is viewed from a side face of the vehicle. The outer surface 73 of the corner part of the cover member 70 forms a corner surface facing the side face of the side frame 14 and the upper edge line 15 on the outer side of the side frame 14 in the vehicle width direction.

Figure 6:
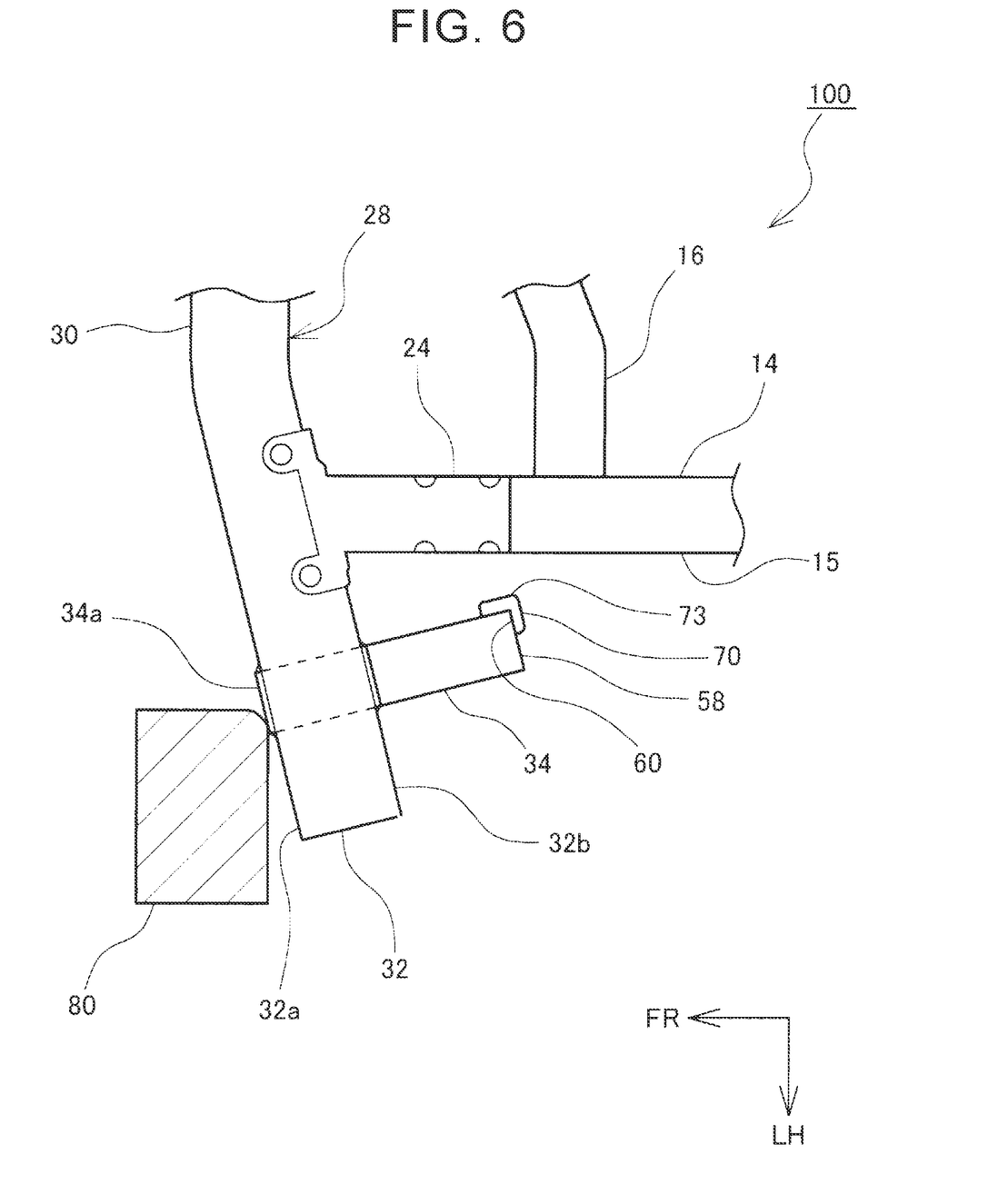
FIG. 6 is a plan view illustrating an initial state of a small overlap collision of the vehicle front structure according to the embodiment.
Figure 7:
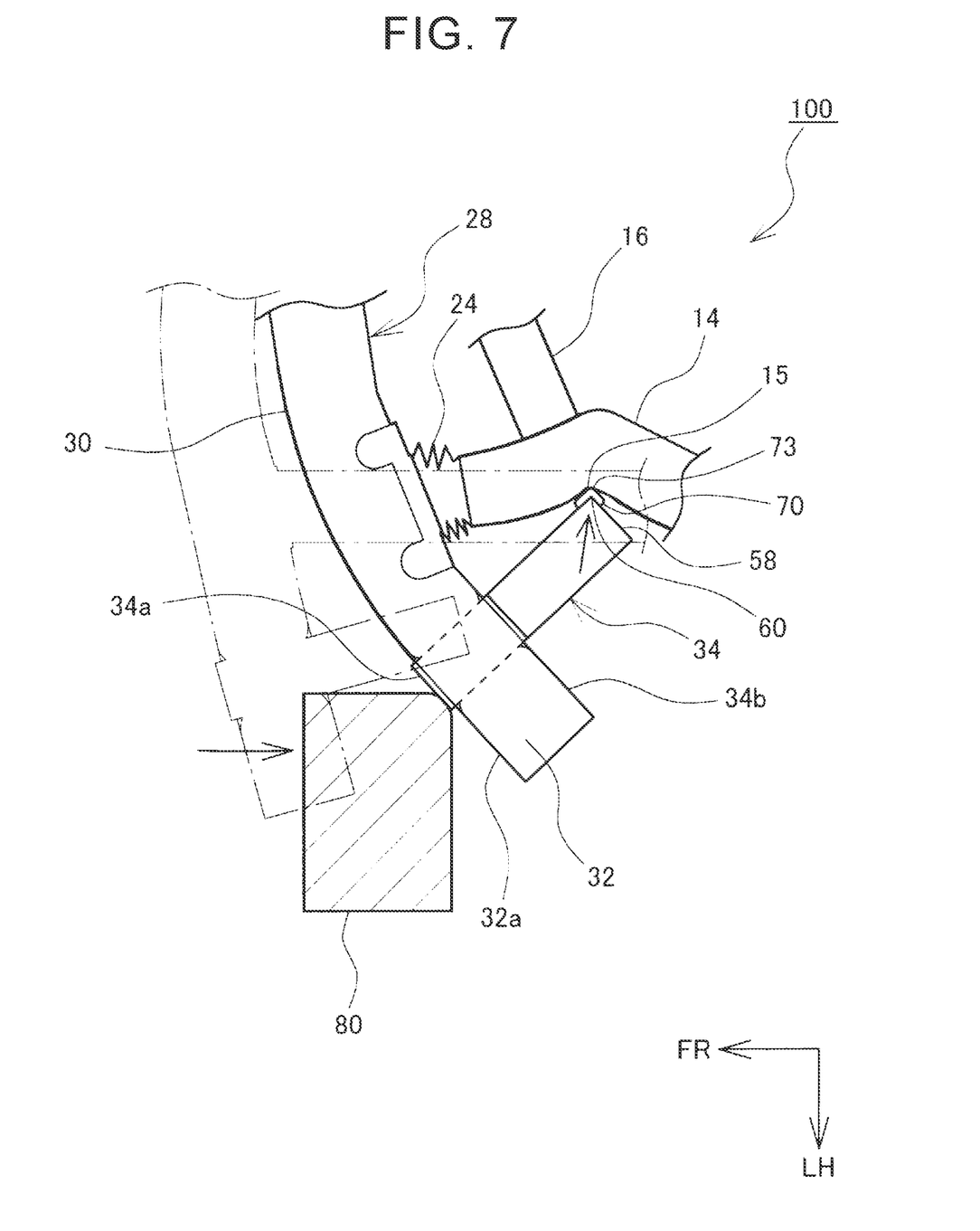
FIG. 7 is a plan view illustrating deformation of the vehicle front structure according to the embodiment in a later stage of the small overlap collision.
Figure 8:
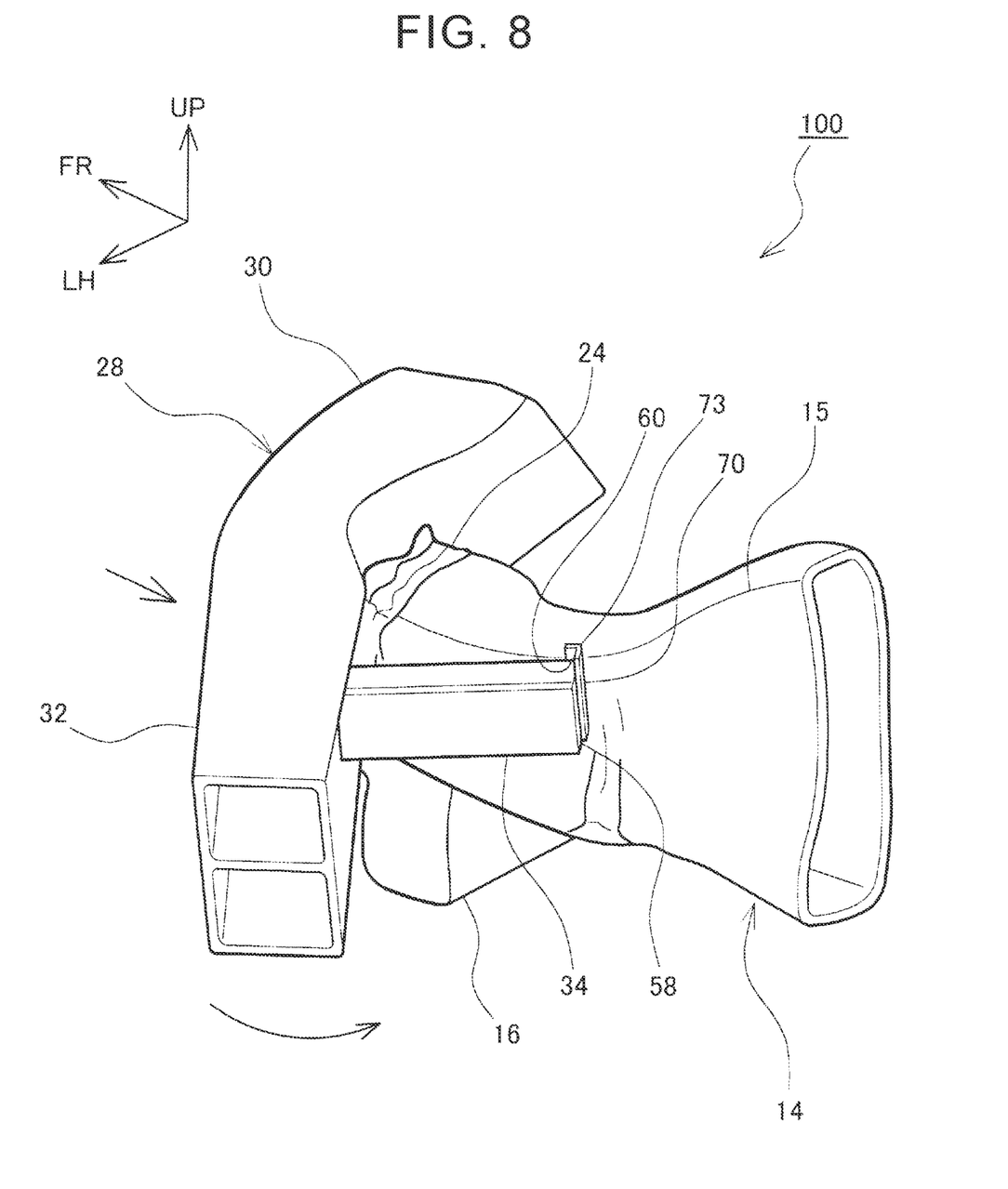
FIG. 8 is a perspective view illustrating deformation of the vehicle front structure according to the embodiment in the later stage of the small overlap collision.

With reference to FIGS. 6 to 8, the following describes deformation of the vehicle front structure 100 at the time of a small overlap collision. As illustrated in FIG. 6, the small overlap collision is a collision mode in which an object collides with an outer part of the vehicle front part in the vehicle width direction, the outer part corresponding to one fourth of the vehicle front part. In a collision test, the vehicle collides with a barrier 80. The barrier 80 collides with a part of the vehicle, the part being positioned outward from the side frame 14 in the vehicle width direction. Accordingly, the side frame 14 may not receive a collision load sufficiently. In the vehicle front structure 100, the collision load is transmitted to the side frame 14 via the load transmission member 34 penetrating through the side end portion 32 of the bumper reinforcement 28.

As illustrated in FIG. 6, in an early stage of a small overlap collision, the barrier 80 collides with the front end portion 34a of the load transmission member 34 provided in the side end portion 32. Then, as illustrated in FIG. 7, the collision load is transmitted to the crash box 24 of the side frame 14, so that the crash box 24 is crushed. At the same time, the central portion 30 and the side end portion 32 of the bumper reinforcement 28 move rearward and bend, so that the rear end 58 of the load transmission member 34 faces more inward in the vehicle width direction and moves inward in the vehicle width direction. As a result, as illustrated in FIG. 8, in a later stage of the small overlap collision, the outer surface 73 of the corner part of the cover member 70 attached to the rear end 58 of the load transmission member 34 abuts with the side face of the side frame 14 and the upper edge line 15 on the outer side of the side frame 14 in the vehicle width direction, so that the collision load is transmitted to the side frame 14. The outer surface 73 is a cylindrical surface with a radius of a few millimeters or less, so that the outer surface 73 starts bending the side frame 14 inward in the vehicle width direction. Hereby, the whole side frame 14 bends inward in the vehicle width direction, so that impact energy is absorbed. Further, the load transmission member 34 supports the side end portion 32 of the bumper reinforcement 28, thereby making it possible to restrain further entry of the barrier 80.

As such, in the vehicle front structure 100 of the present embodiment, at the time of a small overlap collision, the corner part of the cover member 70 makes a surface contact or a line contact with the side face of the side frame 14. The outer surface 73 of the corner part of the cover member 70 has a curved surface. As a result, stress concentration on the side face of the side frame 14 is relaxed, so that desired impact energy can be absorbed by bending and deforming the whole side frame 14 inward in the vehicle width direction by a collision load transmitted from the load transmission member 34.

Further, the upper end 71 of the cover member 70 projects upward from an upper face 35a of the load transmission member 34. Accordingly, even when the rear end 58 of the load transmission member 34 moves downward due to deformation at the time of a collision, the outer surface 73 of the corner part of the cover member 70 can be brought into contact with the upper edge line 15 on the outer side of the side frame 14 in the vehicle width direction. Hereby, the side frame 14 can be more surely bent inward in the vehicle width direction, so that impact energy can be absorbed effectively.

As described above, the vehicle front structure 100 of the embodiment can absorb desired impact energy by bending and deforming the whole side frame 14 by a collision load transmitted from the load transmission member 34 at the time of a collision.

The embodiment described above describes that the bottom end 72 of the cover member 70 projects downward from the bottom face 35b of the load transmission member 34. However, the bottom end 72 may not project downward.

The above embodiment deals with the vehicle front structure 100 for the vehicle including the ladder frame 12. However, the present disclosure is not limited to this, and this disclosure can be also applied to a vehicle including a monocoque frame. In the case of a monocoque frame, a front side member serves as a side frame member.

What is claimed is:

1. A vehicle front structure comprising:
   a pair of right and left side frame members provided in a vehicle front part and extending in a vehicle front-rear direction;
   a bumper reinforcement attached to front ends of the right and left side frame members, the bumper reinforcement extending in a vehicle width direction, the bumper reinforcement having right and left side end portions projecting outward in the vehicle width direction from the side frame members, respectively;
   a load transmission member attached to each of the side end portions of the bumper reinforcement, the load transmission member penetrates through each of the side end portions of the bumper reinforcement such that a front end portion of each load transmission member projects forward in the vehicle front-rear direction from a front face of each of the side end portions, the load transmission member extending rearward in the vehicle front-rear direction and inward in the vehicle width direction, the load transmission member being configured to transmit a collision load to each of the side frame members at a time of a collision; and
   a cover member attached to a rear end of the load transmission member, wherein:
   the cover member is an L-shaped section member in which an outer surface of a corner part of the cover member has a curved surface, the cover member extending in a vehicle up-down direction; and
   the cover member is attached to an inner portion, in the vehicle width direction, of the rear end of the load transmission member such that an upper end of the cover member projects upward from an upper face of the load transmission member, the cover member being configured to cover the inner portion, in the vehicle width direction, of the rear end of the load transmission member.

2. The vehicle front structure according to claim 1, wherein:
   the side frame members are longitudinal members having a square closed sectional shape;
   the cover member is placed to overlap, in an up-down direction, an upper edge line on an outer side of a corresponding one of the side frame members in the vehicle width direction, when the cover member is viewed from a vehicle side face; and
   at the time of the collision, the collision load is transmitted to the corresponding one of the side frame members such that the outer surface of the corner part abuts with the edge line of the corresponding one of the side frame members.

3. The vehicle front structure according to claim 1, wherein an outer portion of the rear end of the load transmission member is exposed from the cover member.

4. A vehicle front structure comprising:
   a pair of right and left side frame members provided in a vehicle front part and extending in a vehicle front-rear direction;
   a bumper reinforcement attached to front ends of the right and left side frame members, the bumper reinforcement extending in a vehicle width direction, the bumper reinforcement having right and left side end portions projecting outward in the vehicle width direction from the side frame members, respectively;
   a load transmission member attached to each of the side end portions of the bumper reinforcement, the load transmission member extending rearward in the vehicle front-rear direction and inward in the vehicle width direction, the load transmission member being configured to transmit a collision load to each of the side frame members at a time of a collision; and
   a cover member attached to a rear end of the load transmission member, wherein:
   the cover member is an L-shaped section member in which an outer surface of a corner part of the cover member has a curved surface, the cover member extending in a vehicle up-down direction; and
   the cover member is attached to an inner portion, in the vehicle width direction, of the rear end of the load transmission member such that an upper end of the cover member projects upward from an upper face of the load transmission member, an outer portion of the rear end of the load transmission member is exposed from the cover member, the cover member being configured to cover the inner portion, in the vehicle width direction, of the rear end of the load transmission member.

5. The vehicle front structure according to claim 4, wherein:
   the side frame members are longitudinal members having a square closed sectional shape;
   the cover member is placed to overlap, in an up-down direction, an upper edge line on an outer side of a corresponding one of the side frame members in the vehicle width direction, when the cover member is viewed from a vehicle side face; and at the time of the collision, the collision load is transmitted to the corresponding one of the side frame members such that the outer surface of the corner part abuts with the edge line of the corresponding one of the side frame members.

* * * * *